US012624585B2

(12) United States Patent
Huang

(10) Patent No.: US 12,624,585 B2
(45) Date of Patent: May 12, 2026

(54) HINGE DAMPING MOUNTING STRUCTURE

(71) Applicant: Jiangmen Gelitu Automatic Machinery Equipment Co., Ltd., Jiangmen (CN)

(72) Inventor: Daonong Huang, Jiangmen (CN)

(73) Assignee: Jiangmen Gelitu Automatic Machinery Equipment Co., Ltd., Jiangmen (CN)

( * ) Notice: Subject to any disclaimer, the term of this patent is extended or adjusted under 35 U.S.C. 154(b) by 0 days.

(21) Appl. No.: 18/769,337

(22) Filed: Jul. 10, 2024

(65) Prior Publication Data

US 2025/0020013 A1 Jan. 16, 2025

(30) Foreign Application Priority Data

Jul. 13, 2023 (CN) ......................... 202321844986.1

(51) Int. Cl.
*E05F 1/08* (2006.01)
*E05D 7/04* (2006.01)
*E05F 3/10* (2006.01)

(52) U.S. Cl.
CPC . *E05F 3/10* (2013.01); *E05D 7/04* (2013.01)

(58) Field of Classification Search
CPC ........... E05Y 2900/20; E05Y 2900/202; E05Y 2900/204; E05Y 2900/208; E05Y 2201/20; E05Y 2201/21; E05Y 2201/261; E05F 5/006; E05F 5/02; E05F 5/027; E05F 3/10; E05F 3/108; E05F 3/20; E05F 16/286; E05D 11/1021; E05D 11/1042; E05D 11/105; E05D 11/1064; E05D 7/04; E05D 7/0407; E05D 7/125; E05D 3/142
See application file for complete search history.

(56) References Cited

U.S. PATENT DOCUMENTS

2011/0072617 A1* 3/2011 Lin ......................... E05F 5/006 16/298
2017/0152693 A1* 6/2017 Chen ....................... E05F 5/027
2021/0148151 A1* 5/2021 Weber ....................... E05F 5/02

FOREIGN PATENT DOCUMENTS

| | | | | | |
|---|---|---|---|---|---|
| CN | 102287101 | A | * | 12/2011 | |
| CN | 108252604 | A | * | 7/2018 | E05F 3/06 |
| CN | 109236082 | A | * | 1/2019 | E05F 5/10 |
| CN | 211714850 | U | * | 10/2020 | |
| CN | 211714851 | U | * | 10/2020 | |
| IT | 202100031526 | A1 | * | 3/2023 | E05F 5/006 |
| WO | WO-2021045700 | A1 | * | 3/2021 | E05F 3/20 |
| WO | WO-2022007475 | A1 | * | 1/2022 | E05D 11/10 |

* cited by examiner

*Primary Examiner* — Chuck Y Mah

(57) ABSTRACT

A hinge damping mounting structure including, a first rotating shaft and a second rotating shaft provided at an end of a long arm; a first connecting arm hinged to the first rotating shaft; a second connecting arm hinged to the first rotating shaft; a pocket hinged to the first connecting arm and second connecting arm; a mobile rack including a first direction and a second direction perpendicular to each other, the mobile rack is mounted between the long arm and the second connecting arm, the mobile rack is limited by the long arm and the second connecting arm to translate in the first direction; an oil cylinder mounted on the second connecting arm along the second direction, a telescopic shaft of the oil cylinder is connected to the mobile rack, an end of a cylinder shell of the oil cylinder is supported by the first rotating shaft.

5 Claims, 4 Drawing Sheets

HINGE DAMPING MOUNTING STRUCTURE

CROSS-REFERENCE TO RELATED APPLICATIONS

The present application claims priority of Chinese Patent Application No. 202321844986.1, filed on Jul. 13, 2023, the entire contents of which are hereby incorporated by reference.

TECHNICAL FIELD

The present invention relates to a hinge field, and particularly to a hinge damping mounting structure.

BACKGROUND

Conventional hinges are usually equipped with dampers/oil cylinders, the oil cylinders are usually installed in the hinges by welding or screw locking, and an assembly process is cumbersome. And during use, a main body of the oil cylinders usually moves with the hinges, a certain degree of vibration is produced by a movement of the oil cylinders, and a piston shaft of the oil cylinders telescopically moves at the same time. After long-term use, a large degree of internal wear of the oil cylinders is easily caused, thereby resulting in unstable operation of the oil cylinders.

SUMMARY

A purpose of the present disclosure is to overcome at least one of above technical problems in related technologies to a certain extent. Therefore, the present disclosure provides a hinge damping mounting structure.

In order to achieve the above purpose, a technical solution of the present disclosure is as follows:

According to one embodiment of the present disclosure, a hinge damping mounting structure including:

- a long arm, and a first rotating shaft and a second rotating shaft are provided at an end of the long arm;
- a first connecting arm, and the first connecting arm is hinged to the first rotating shaft;
- a second connecting arm, and the second connecting arm is hinged to the second rotating shaft;
- a pocket, and the pocket is hinged to the first connecting arm and the second connecting arm;
- a mobile rack, including a first direction and a second direction perpendicular to each other, and the mobile rack is slidingly mounted between the long arm and the second connecting arm, the mobile rack is limited by the long arm and the second connecting arm to translate in the first direction, the mobile rack is capable of reciprocate and translate along a length direction of the long arm in the second direction, and when the second connecting arm is rotated around the second rotating shaft, the mobile rack is pulled by the second connecting arm to translate in the second direction toward the first connecting arm;
- an oil cylinder, and the oil cylinder is mounted on the second connecting arm along the second direction, a telescopic shaft of the oil cylinder is connected to the mobile rack in a direction away from the first connecting arm, and an end of a cylinder shell of the oil cylinder is supported by the first rotating shaft.

According to some embodiments of the present disclosure, the hinge damping mounting structure has at least the following beneficial effects: the overall structure is simple and the installation is very convenient; during a working process, the cylinder shell of the oil cylinder does not move relative to the long arm, and only the telescopic shaft moves telescopically, thereby making a translational movement of the mobile rack more stable and reliable.

According to some embodiments of the present disclosure, a spring is sleeved on the first rotating shaft, and one pin of the spring is abutted against the long arm, the other pin of the spring is abutted against the second connecting arm, and the end of the cylinder shell of the oil cylinder is abutted against a side wall of the spring.

According to some embodiments of the present disclosure, a hook part is provided on the second connecting arm, and a protrusion part is provided on the mobile rack, when the second connecting arm is rotated around the second rotating shaft, the hook part moves relative to the protrusion part, and the hook part is capable of abut against the protrusion part to pull the mobile rack to translate.

According to some embodiments of the present disclosure, two hook parts are symmetrically provided on two sides of the second connecting arm, two protrusion parts are symmetrically provided on two sides of the mobile rack, and the two hook parts and the two protrusion parts are paired one to one.

According to some embodiments of the present disclosure, a sliding chute is provided on the mobile rack along the second direction; a support block is located on the cylinder shell of the oil cylinder, and the support block is passed through the sliding chute and abutted against the second rotating shaft; when the mobile rack is translated, the support block is slid relative to the sliding chute, and a travel distance of the mobile rack is limited by an opening length of the sliding chute.

According to some embodiments of the present disclosure, two extension walls are provided on two sides of the mobile rack, the two extension wall are extended toward the long arm along the first direction, one upper end surface of the two extension walls is abutted against the long arm, and the oil cylinder is located between the two extension walls.

According to some embodiments of the present disclosure, a counterbore hole is provided on a side wall of the mobile rack, and an end of the telescopic shaft is inserted into and abutted against the counterbore hole.

Additional aspects and advantages of the present disclosure are partially shown in the following description, and some of them become obvious from the following description, or can be learned through a practice of the present disclosure.

BRIEF DESCRIPTION OF DRAWINGS

The above and/or additional aspects and advantages of the present disclosure can be better understood in conjunction with embodiments described in the following drawings.

Figure 1:
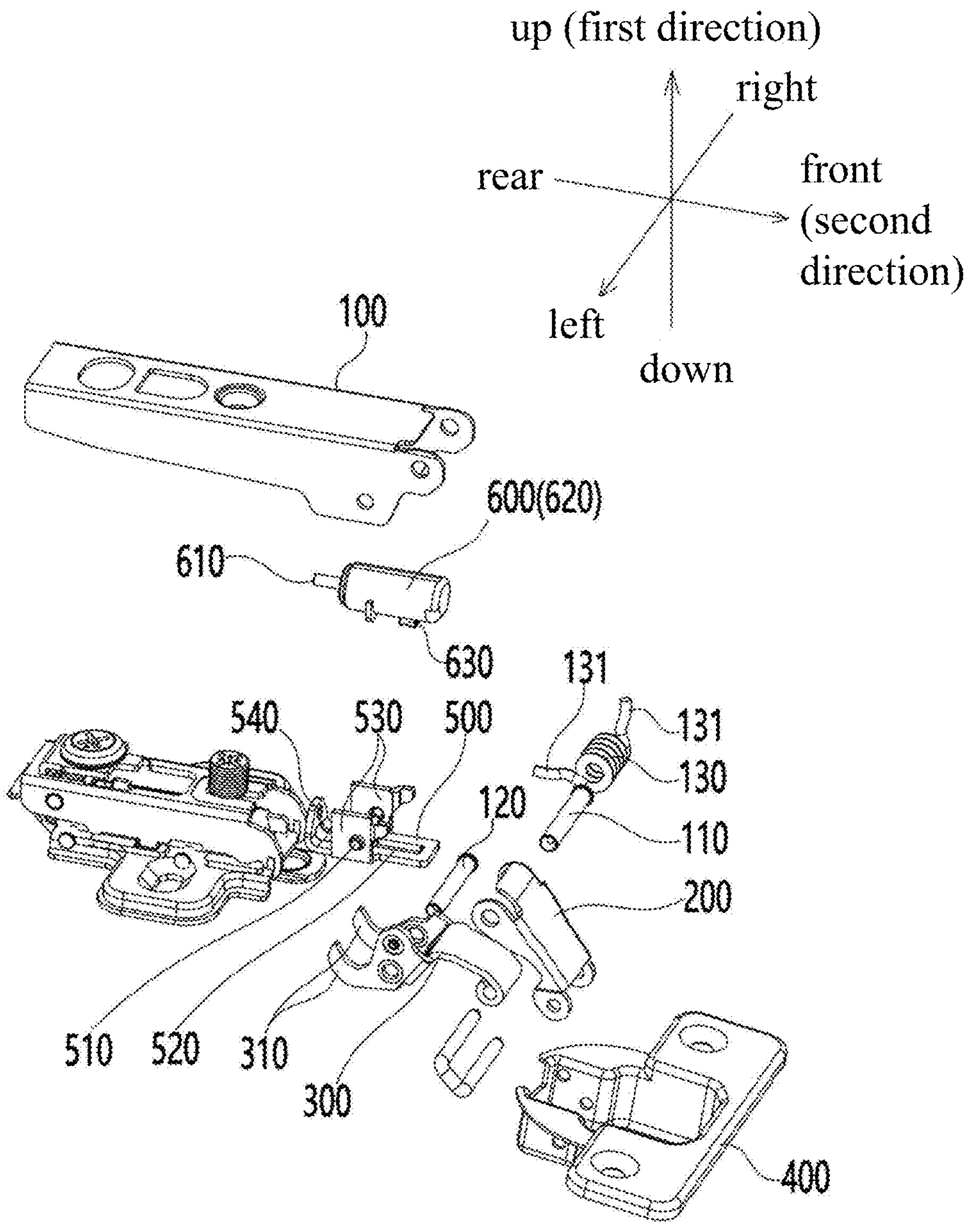
FIG. 1 is a structural decomposition schematic diagram according to an embodiment of the present disclosure.

Symbols in the drawings: long arm 100; first rotating shaft 110; second rotating shaft 120; spring 130; pin 131; first connecting arm 200; a second connecting arm 300; hook part 310; pocket 400; mobile rack 500; oil cylinder 600; telescopic shaft 610; cylinder shell 620; support block 630.

DESCRIPTION OF EMBODIMENTS

Embodiments of the present disclosure are clearly and completely described below. Examples of the embodiments are shown in the accompanying drawings, in which same or like references indicate same or similar elements or elements having same or like functions. The embodiments described below with reference to the accompanying drawings are exemplary, and are only used to explain the present disclosure and not used to limit the present disclosure.

The present disclosure relates to a hinge damping mounting structure, including a long arm 100, a first connecting arm 200, a second connecting arm 300, a pocket 400, a mobile rack 500 and an oil cylinder 600.

Figure 2:
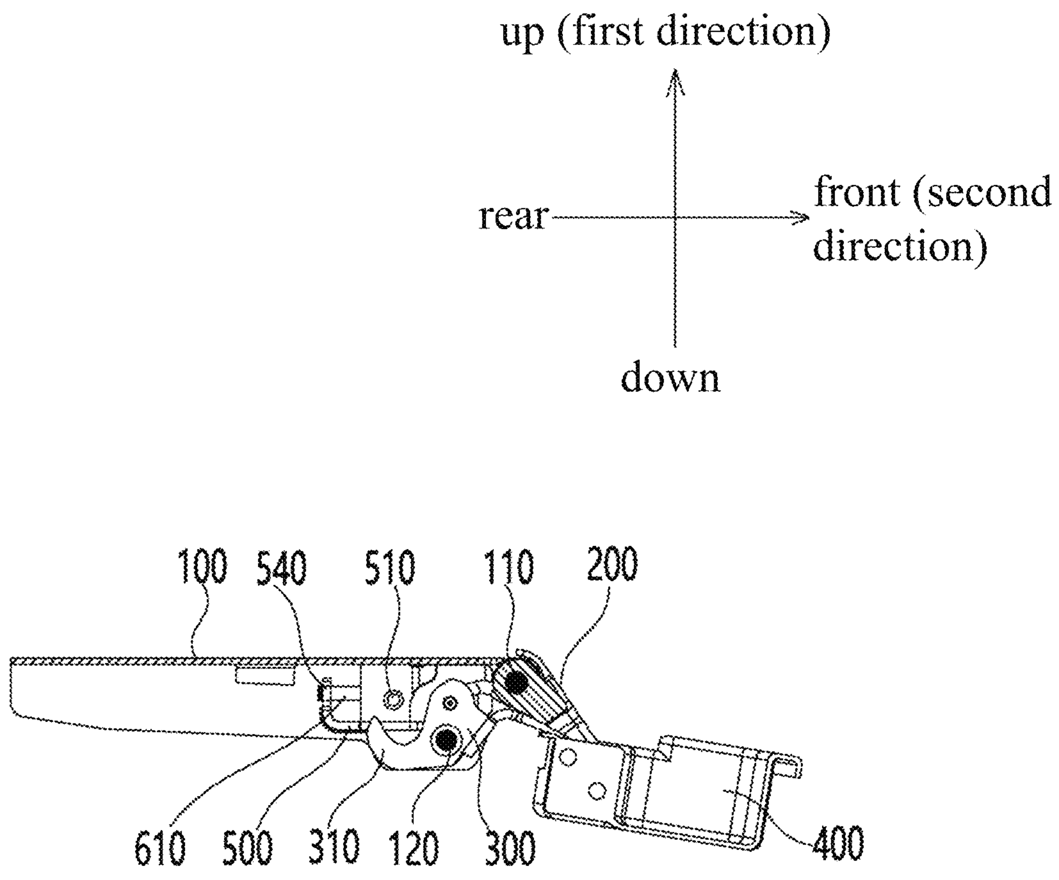
FIG. 2 is an internal schematic diagram of partial structure assembly according to an embodiment of the present disclosure.

Referring to FIG. 1 and FIG. 2, in a direction of FIG. 1 and FIG. 2, a rear part of the long arm 100 is connected to a main body of a hinge. A first rotating shaft 110 and a second rotating shaft 120 are provided at a front end of the long arm 100. The first rotating shaft 110 and the second rotating shaft 120 are parallel to each other. One end of the first connecting arm 200 is hinged to the first rotating shaft 110, and the other end of the first connecting arm 200 is hinged to the pocket 400. One end of the second connecting arm 300 is hinged to the second rotating shaft 120, and the other end of the second connecting arm 300 is hinged to the pocket 400. The mobile rack 500 is located between the long arm 100 and the second connecting arm 300. In the direction of FIG. 1 and FIG. 2, the mobile rack 500 is located on a lower side of the long arm 100 and on an upper side of the second connecting arm 300. The mobile rack 500 includes a first direction and a second direction perpendicular to each other. In the direction of FIG. 1 and FIG. 2, the first direction is an up-down vertical direction, the second direction is a front-rear lateral direction, and the second direction is also a length direction of the long arm 100. A relative upward movement of the mobile rack 500 is limited by an inner wall of the long arm 100, a bottom of the mobile rack 500 is abutted against the second rotating shaft 120, and a downward movement of the mobile rack 500 is limited by the second rotating shaft 120, thereby limiting the mobile rack 500 to move up and down in the first direction relative to the long arm 100. The mobile rack 500 is translated forward and backward along the length direction of the long arm 100 in the second direction. The oil cylinder 600 is mounted on the second connecting arm 300. A telescopic shaft 610 of the oil cylinder 600 is connected backwards on a rear wall of the mobile rack 500, an end (front end) of a cylinder shell 620 of the oil cylinder 600 is supported by the first rotating shaft 110, that is, the end of the cylinder shell 620 of the oil cylinder 600 is directly or indirectly abutted against the first rotating shaft 110.

During use, the pocket 400 is flipped up and down relative to the long arm 100 through the first connecting arm 200 and the second connecting arm 300. Referring to FIG. 2, in a direction shown in FIG. 2, when the pocket 400 is flipped upward, the second connecting arm 300 is rotated clockwise around the second rotating shaft 120. When the second connecting arm 300 is rotated clockwise, the mobile rack 500 is pulled by the second connecting arm 300 to translate forward toward the first rotating shaft 110. When the mobile rack 500 is translated forward, the oil cylinder 600 is supported by the first rotating shaft 110, and the cylinder shell 620 of the oil cylinder 600 is limited to translate forward; at this time, the telescopic shaft 610 is pushed forward by the mobile rack 500, and the telescopic shaft 610 is gradually retracted into the oil cylinder 600, thereby damping the forward movement of the mobile rack 500 and reducing a speed of the mobile rack 500 translating forward. That is, a clockwise rotation speed of the second connecting arm 300 and a speed of upward flipping of the pocket 400 are slowed down. When the pocket 400 is flipped downward relative to the long arm 100 to reset, the second connecting arm 300 is rotated counterclockwise around the second rotating shaft 120, the second connecting arm 300 is disengaged from the moving frame 500, the pocket 400 can be quickly flipped downward, a pulling effect of the second connecting arm 300 on the mobile rack 500 is lost, and the telescopic shaft 610 of the oil cylinder 600 is extended backward to push the mobile rack 500 to translate backward and reset. An installation of both the mobile rack 500 and the oil cylinder 600 is limited by the long arm 100, the first rotating shaft 200, the second rotating shaft 300 and the like components, and there is no need to use other locking parts such as screws to connect; thus an overall structure is simple and the installation is very convenient. During working, the cylinder shell 620 of the oil cylinder 600 does not move relative to the long arm 100, and only the telescopic shaft 610 moves telescopically, thereby making a translational movement of the mobile rack 500 more stable and reliable.

Figure 3:
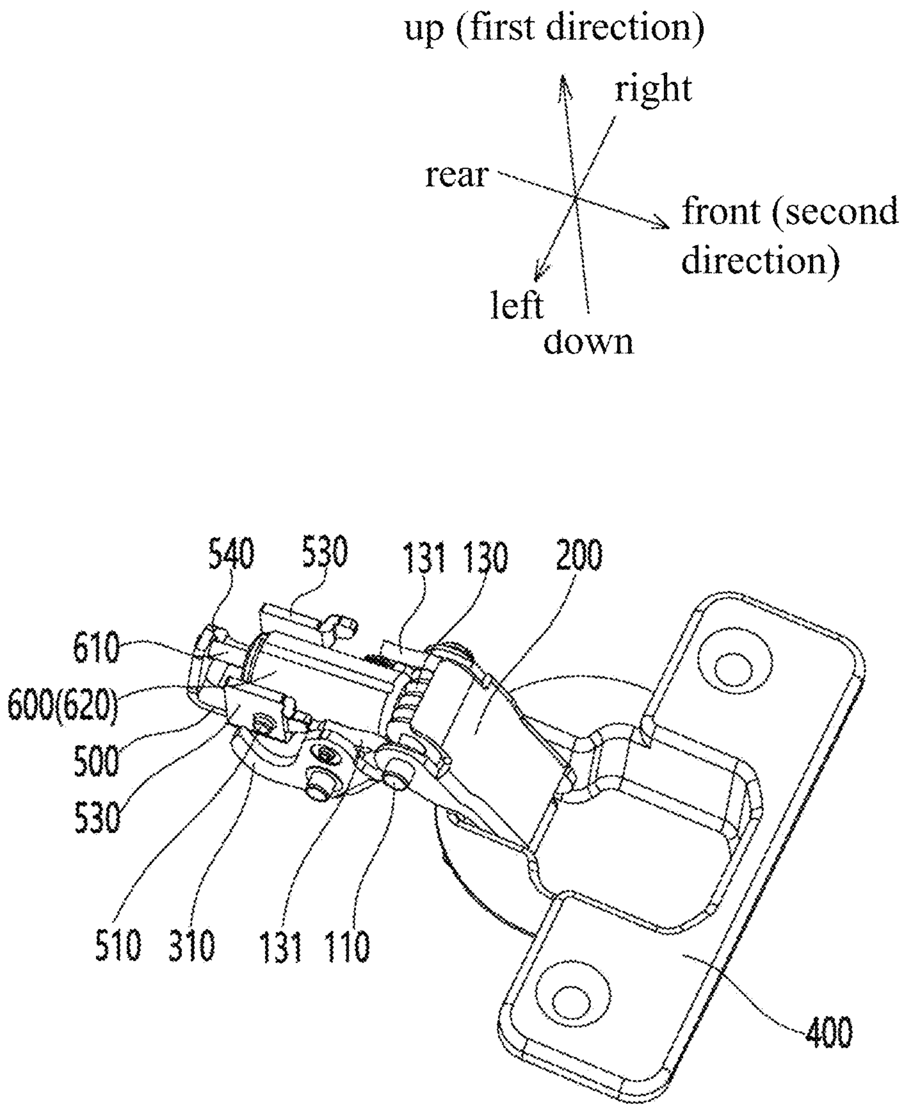
FIG. 3 is a schematic diagram of partial structure assembly according to an embodiment of the present disclosure.

In some embodiments of the present disclosure, as shown in FIG. 1 and FIG. 3, a spring 130 is sleeved on the first rotating shaft 110. A pin is led out from both ends of the spring 130. The pin 131 at one end is abutted against the long arm 100, and the pin 131 at the other end is abutted against the second connecting arm 300. When the pocket 400 is flipped upward, the spring 130 is subjected to torsional elastic compression. When the pocket 400 flipped downward, the spring 130 elastic resets and assists the pocket 400 to flip downward. The front end of the the cylinder shell 620 of the oil cylinder 600 is abutted against the spring 130, that is, the front end of the cylinder shell 620 of the oil cylinder 600 is indirectly abutted against the first rotating shaft 110 to support the oil cylinder 600 rearward.

In some embodiments of the present disclosure, as shown in FIG. 1, FIG. 2 and FIG. 3, a hook part 310 is extended from a rear side of the second connecting arm 300, and the hook part 310 is presented a curved hook shape towards the rear and upper ward. A protrusion part 510 is provided on the mobile rack 500. In one embodiment, the protrusion part 510 can be a cylindrical protrusion. When the second connecting arm 300 is rotated clockwise, the hook part 310 is rotated with the second connecting arm 300 and abutted against the protrusion part 510, and then pushing the mobile rack 500 to move forward. When the second connecting arm 300 is rotated counterclockwise, the hook part 310 can be quickly detached from the protrusion part 510. The hook parts 310 can be symmetrically provided on a left side and a right side of the second connecting arm 300, and correspondingly, the protrusion parts 510 can be symmetrically provided on a left side and a right side of the mobile rack 500. The hook parts 310 on the left side and the right side of the second connecting arm 300 are paired with the protrusion parts 510 on the left side and the right side of the mobile rack 500 one to one, to ensure a stability when pulling the mobile rack 500 forward.

Figure 4:
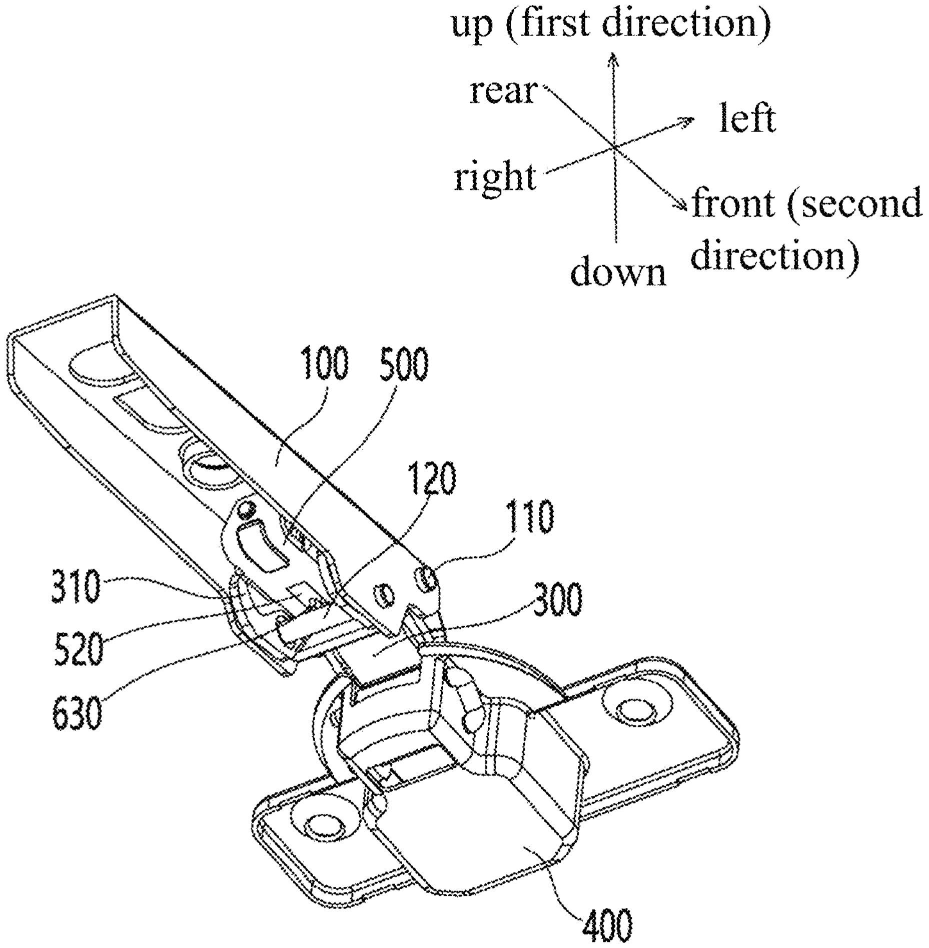
FIG. 4 is a schematic diagram of a bottom direction of partial structure assembly according to an embodiment of the present disclosure.

In some embodiments of the present disclosure, as shown in FIG. 1 and FIG. 4, a sliding chute 520 is provided at a bottom of the mobile rack 500, and the sliding chute 520 is extended forward and rearward along the second direction. A support block 630 is provided on the cylinder shell 620 of the oil cylinder 600, and the support block 630 is passed through the sliding chute 520 and abutted against the second rotating shaft 120. Ends of the support block 630 can be configured to be an arc-shaped portion matching a shape of the second rotating shaft 120. The mobile rack 500 and the oil cylinder 600 are supported by the second rotating shaft 120 at the same time. When the mobile rack 500 is translated, a lower side of the mobile rack 500 is lapped on the second rotating shaft 120 to slide forward and rearward relative to the long arm 100, and the sliding chute 520 slides forward and rearward with the mobile rack 500 relative to the support block 630. When the pocket 400 is flipped downward, and the mobile rack 500 is translated rearward, and a front end of sliding chute 520 is abutted against the support block 630, thereby limiting a travel distance of a translation seat moving forward.

In some embodiments of the present disclosure, as shown in FIG. 1 and FIG. 3, an extension wall 530 is provided on both the left side and the right side of the mobile rack 500, and the extension wall 530 is extended upward along the first direction toward the long arm 100. An upper end surface of the extension wall 530 is abutted against the long arm 100, and the extension wall 530 and the long arm 100 are in contact to limit a position.

An end of the telescopic shaft 610 can be connected to the mobile rack 500 by means of a snap-in connection or the like. In some embodiments of the present disclosure, as shown in FIG. 1 and FIG. 3, a counterbore hole 540 is provided on a rear side wall of the mobile rack 500. The end of the telescopic shaft 610 is inserted into and abutted against the counterbore hole 540, thereby achieving quick installation.

In the description of the present disclosure, reference terms “some embodiments” and the like means that the specific features, structures, materials or characteristics described in combination with the embodiment or example are included in at least one embodiment or example of the present disclosure. In the description of the present disclosure, the illustrative descriptions of the above terms do not necessarily refer to the same embodiment or example. Furthermore, the specific features, structures, materials, or characteristics described can be combined in an appropriate manner in any one or more embodiments or examples.

The above are merely some embodiments of the present disclosure, cannot be construed to limit the present disclosure. Any changes, modifications, alternatives and variations can be made in the embodiments without departing from the scope of the present disclosure, but these all fall into the protection scope of the present disclosure.

The invention claimed is:

1. A hinge damping mounting structure, comprising:

a long arm (100), wherein a first rotating shaft (110) and a second rotating shaft (120) are provided at an end of the long arm (100);

a first connecting arm (200), hinged to the first rotating shaft (110);

a second connecting arm (300), hinged to the second rotating shaft (120);

a pocket (400), hinged to the first connecting arm (200) and second connecting arm (300);

a mobile rack (500), comprising a first direction and a second direction perpendicular to each other, wherein the mobile rack (500) is slidingly mounted between the long arm (100) and the second connecting arm (300), the mobile rack (500) is limited by the long arm (100) and the second connecting arm (300) to translate in the first direction, the mobile rack (500) is capable of reciprocate and translate along a length direction of the long arm (100) in the second direction, and when the second connecting arm (300) is rotated around the second rotating shaft (120), the mobile rack (500) is pulled by the second connecting arm (300) to translate in the second direction toward the first connecting arm (200);

an oil cylinder (600), mounted on the mobile rack (500) along the second direction, wherein the oil cylinder (600) comprises a telescopic shaft (610) and a cylinder shell (620), the telescopic shaft (610) is connected to the mobile rack (500) in a direction away from the first connecting arm (200), and an end of the cylinder shell (620) is supported by the first rotating shaft (110);

a spring (130), sleeved on the first rotating shaft (110), wherein one leg of the spring (130) is abutted against the long arm (100), the other leg of the spring (130) is abutted against the second connecting arm (300), and the end of the cylinder shell (620) of the oil cylinder (600) is abutted against a side wall of the spring (130);

wherein a sliding chute (520) is provided on the mobile rack (500) along the second direction; a support block (630) is located on the cylinder shell (620) of the oil cylinder (600), and the support block (630) is passed through the sliding chute (520) and abutted against the second rotating shaft (120); when the mobile rack (500) is translated, the support block (630) is slid relative to the sliding chute (520), and a travel distance of the mobile rack (500) is limited by an opening length of the sliding chute (520).

2. The hinge damping mounting structure of claim 1, wherein at least one hook part (310) is provided on the second connecting arm (300), and at least one protrusion part (510) is provided on the mobile rack (500), when the second connecting arm (300) is rotated around the second rotating shaft (120), the hook part (310) moves relative to the protrusion part (510), and the hook part (310) is capable of abut against the protrusion part (510) to pull the mobile rack (500) to translate.

3. The hinge damping mounting structure of claim 2, wherein the at least one hook part (310) comprises two hook parts (310), the two hook parts (310) are symmetrically provided on two sides of the second connecting arm (300), the at least one protrusion part (510) comprises two protrusion parts (510), the two protrusion parts (510) are symmetrically provided on two sides of the mobile rack (500), and the two hook parts (310) and the two protrusion parts (510) are paired one to one.

4. The hinge damping mounting structure of claim 1, wherein two extension walls (530) are provided on two sides of the mobile rack (500), the two extension walls (530) are extended toward the long arm (100) along the first direction, one upper end surface of the two extension walls (530) is abutted against the long arm (100), and the oil cylinder (600) is located between the two extension walls (530).

5. The hinge damping mounting structure of claim 1, wherein a counterbore hole (540) is provided on a rear wall of the mobile rack (500), and an end of the telescopic shaft (610) is inserted into and abutted against the counterbore hole (540).

* * * * *